July 30, 1957   J. H. BORNZIN ET AL   2,800,996
HOLD-DOWN MEMBER FOR A MATERIAL FEEDING PLATFORM
Filed June 25, 1953
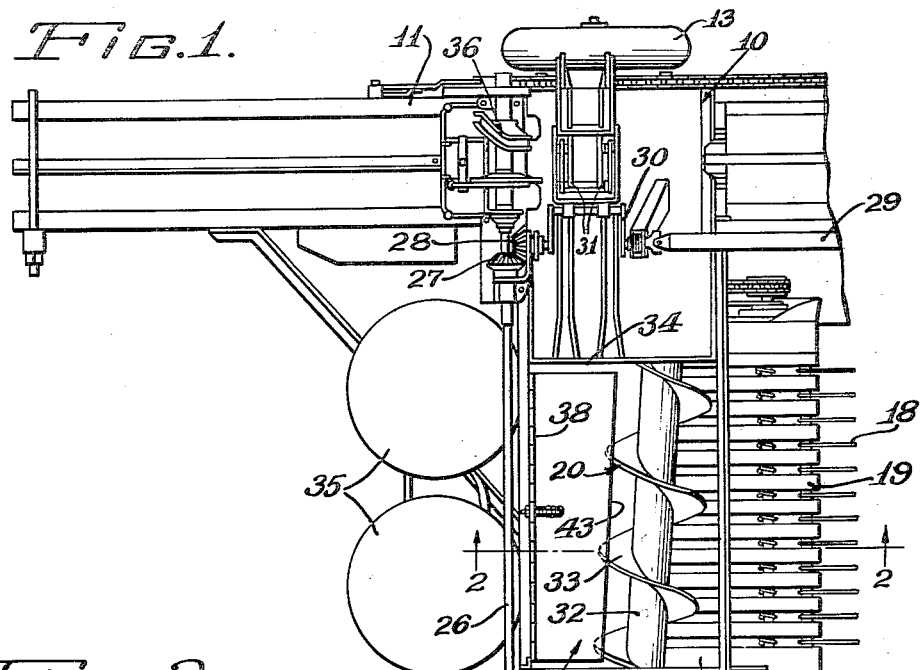
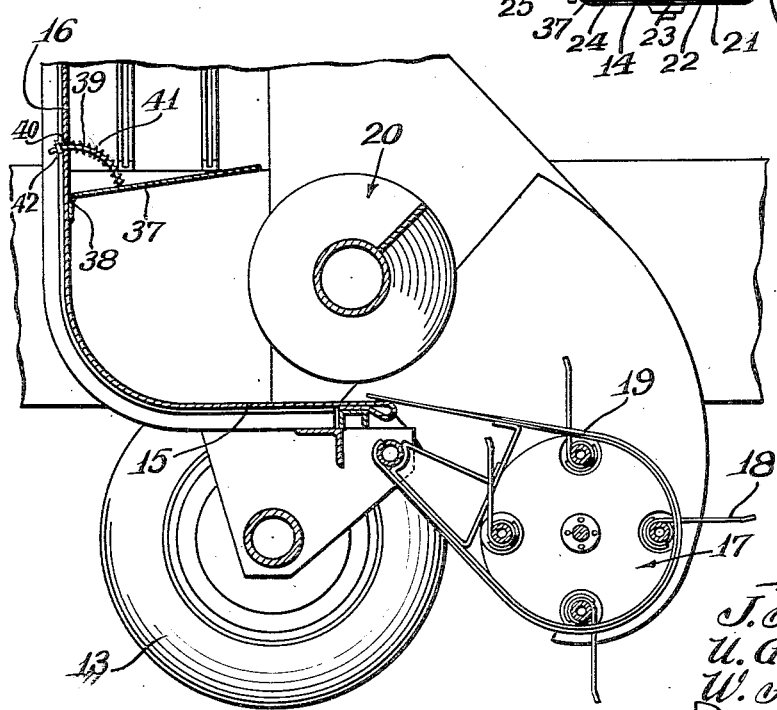
Inventors:
J. H. Bornzin
U. G. Currier
W. A. Reibell
Paul O. Pippel
Atty.

United States Patent Office 2,800,996
Patented July 30, 1957

2,800,996

HOLD-DOWN MEMBER FOR A MATERIAL FEEDING PLATFORM

James H. Bornzin, Ulysses G. Currier, and Willard A. Reibell, Memphis, Tenn., assignors to International Harvester Company, a corporation of New Jersey Application June 25, 1953, Serial No. 364,104

5 Claims. (Cl. 198—213)

This invention relates to a new and improved hold down member for a material feeding platform.

Many agricultural implements and particularly harvesting implements employ platforms arranged to receive harvested material nad thereafter aggregate this material at some particular portion of the platform. It is thus apparent that these platforms have conveying means thereon for effecting movement of harvested material. In recent years auger type conveyors have come into common use on harvester platforms.

It is, therefore, a principal object of this invention to provide means in association with an auger conveyor of a harvester platform which will function to hold down the material being conveyed and simultaneously strip the auger of the material it is conveying.

An important object of this invention is the provision of means for aggregating material being harvested on a platform and arranging that material in such a manner that it may easily be received and delivered to treating mechanisms associated with the harvesting machine.

Another important object of this invention is to supply, in conjunction with a platform auger for transporting harvested material to one end of a platform, means for arranging the transported material longitudinally of the platform whereby the material may be conveniently grasped by fork means or the like and delivered to another portion of the agricultural implement for subsequent treatment.

Another and further important object of this invention is to provide a spring yielding hold down member disposed along the rearward edge of a platform auger.

Still another important object of this invention is the provision of a combination hold down member and auger stripping member arranged for association with an auger having slight angular disposition with respect to a platform back wall and the leading edge of the hold down member lying parallel to and closely adjacent the rearwardly disposed top edge of the auger.

Other and further important objects and advantages of this invention will become apparent from the disclosures in the following specification and accompanying drawing.

In the drawing:

Figure 1 is a top plan view of a portion of a hay baler incorporating a hold down member for the harvesting platform thereof;

Figure 2 is a sectional view taken on the line 2—2 of Figure 1.

As shown in the drawing, the reference numeral 10 indicates generally a hay baler frame structure having a longitudinally extending bale-forming chamber 11 and a laterally disposed harvesting platform 12 all of which are mounted on spaced apart wheels 13 and 14.

The present invention has been shown in association with a hay baler but it is not to be construed that the device is limited to use only on hay balers. It should be understood that the combination material hold down and stripping device of this invention is equally applicable to all machines having harvesting platforms and particularly those employing transversely disposed auger conveyors thereon. Therefore, the platform 12 of the hay baler 10 as shown in Figure 1 includes the inventive portions of the present disclosure. The platform 12 consists of a relatively flat deck portion 15 and an upwardly extending rearwardly disposed back wall 16 forming a continuation of the flat deck 15. Material to be harvested or treated is picked up from the field in the present machine by means of a pickup cylinder 17 having radially extending fingers or tines 18 to scrape the ground and lift the hay or other material upwardly and rearwardly over a plurality of spaced apart leaf-type slat members 19 whereupon the material so harvested is swept rearwardly onto the flat deck portion 15 of the platform. An auger conveyor 20 is supported at 21 at the outer end of the platform 12 at a location above the carrying wheel 21. The auger is mounted on a shaft 22 having a sprocket 23 fixed thereto which receives rotational drive from a chain 24. The chain 24 in turn receives its drive from a sprocket 25 which is mounted on a shaft 26. The shaft 26 projects along the back wall 16 of the platform and across to a driving mechanism including cooperative beveled gears 27 and 28. These gears are driven by a power shaft 29 which receives its drive from an engine or tractor power takeoff shaft, not shown. The shaft 29 imparts rotatable drive to a crank member 30 causing a fork-like grasping movement of packer fingers 31. Thereafter drive from the shaft 29 is continued through movement of the crank 30 directly to the bevel gear 28.

The auger conveyor 20 includes a relatively large diameter core 32 and a spiral flight 33 welded or otherwise fastened thereto. This auger conveyor is disposed in generally the same direction as the back wall 16 and thus feeds material delivered to the platform across the platform and along the back wall to the inner end thereof as designated by the numeral 34. When material arrives at this location 34 it is grasped by the fork feeding packer fingers 31 and carried into the bale-forming chamber 11 for discharge rearwardly in compacted bales. The bales are maintained in compressed form by bale encircling twine or wire received from receptacles 35 located to the rear of the platform 12. The knotting or wire twisting mechanism is generally designated by the numeral 36 and inasmuch as that phase of that machine forms no part of the present invention it will not be further discussed. Although the auger conveyor 20 runs generally in the same direction as the back wall 16 of the platform, it is slightly angularly disposed with respect to the back wall so there is a greater space between the back wall and the auger at the discharge end 34 thereof. This particular construction enables the platform to move more material without undesirable congestion and further permits easy handling of material after it has been discharged by the auger into the relatively enlarged portion 34 of the platform.

As the device of this invention progresses through a field of windrowed hay or the like the pickup cylinder 17 delivers the hay upwardly and rearwardly onto the flat deck portion 15 of the platform 12 whereupon the auger conveyor 20 tends to move the hay transversely and thus cause its aggregation at the position 34 on the platform. In order to insure the transverse delivery of the hay rather than a winding of hay onto and around the auger conveyor there is provided a combination material hold down member and auger stripping device as shown at 37. This member 37 is substantially flat and is adapted to fill the space between the back wall 16 of the platform and the auger conveyor 20 at its forward edge. A hinge member 38 is fastened to the back wall 16 and supports the hold down member 37 for vertical swinging movement thereabout. A rigid arcuate guide member 39 is fastened to the top of the hold down member 37 and freely passes through an opening 40 in the back wall 16 of the platform. A coil spring 41 surrounds the arcuate guide member 39 and is disposed between the back wall 16 and the hold down member 37 whereupon the hold down member 37 may yield upwardly only through compression of the spring 41. A nut or collar 42 is fastened to the rigid arcuate member 39 on the outside of the back wall 16 thus limiting the downward movement of the hold down member 37.

The hold down member 37 does not have a regular rectangular shape inasmuch as it is employed to substantially fill the area between the back wall and the auger and because the auger is slightly angled so also is the forward edge 43 of the hold down member. This leading edge 43 of the hold down member lies parallel to the auger conveyor 20 and is closely adjacent the upper rearward edge of the auger conveyor. It is thus obvious that the hold down member 37 is wider at the discharge end 34 of the platform 12 than the outer auger supporting end of the platform.

In the operation of the device of this invention material being fed laterally by the auger conveyor 20 is forced rearwardly thereof and upwardly against the hold down member 37 whereupon the hay entering the platform 12 is turned substantially longitudinally with respect to the platform rather than transversely thereof. If the hay were fed solely by the uninterrupted action of the auger 20 the stalks thereof would lie parallel with the fork fingers making it difficult for the fork to grasp the hay. However, when the hay has been turned crosswise to a longitudinal positioning of the stalks at the location 34 of the platform the packer or fork fingers 31 may easily come down and fork that material into the bale-forming chamber 10 where the material is compacted and made into bales. When greater quantities of material are delivered to the platform 12 the hold down member 37 may yield upwardly to compensate for these irregular quantities of material and yet the material being fed is not permitted to climb over onto the top of the auger conveyor inasmuch as the lead edge 43 is parallel to and closely adjacent the auger conveyor 20.

Numerous details of construction may be varied throughout a wide range without departing from the principles disclosed herein and we, therefore, do not propose limiting the patent granted thereon otherwise than as necessitated by the appended claims.

What is claimed is:

1. A hay or like material feeding platform comprising a substantially flat deck portion and a substantially vertically disposed back wall for and generally arranged transversely of said platform and being integral with said flat deck, an auger conveyor disposed transversely of said platform and located in front of said back wall and extending in generally the same direction, a hay or like material hold down member substantially coextensive with said auger conveyor, said hold down member hingedly mounted at one side on said back wall at substantially the level of the top of the auger conveyor and extending forwardly where the other forward side terminates closely adjacent the auger conveyor, and spring means urging said hold down member in a down position.

2. A device as set forth in claim 1 in which stop means is provided to limit the downward movement of the hold down member.

3. A device as set forth in claim 1 in which the auger conveyor is disposed at a slight angle with said back wall, and said hay or like material hold down member varying in extent from hinge to forward side whereby the forward side thereof lies parallel to and closely adjacent to the rearward edge of said auger conveyor.

4. A hay or like material feeding platform comprising a substantially flat deck portion and a substantially vertically disposed back wall for said platform being integral with said flat deck, an auger conveyor disposed in front of said back wall and extending in generally the same direction, a hay or like material hold down member hingedly mounted on said back wall at substantially the level of the top of the auger conveyor, an arcuate guide member fastened to the top of said hold down member, said platform back wall having an opening therein for the passage of said arcuate guide member, and spring means surrounding said arcuate guide member and located between the hold down member and the platform back wall whereby the hold down member is normally urged downwardly.

5. A device as set forth in claim 4 in which fixed collar means, larger than the back wall opening, is provided on the end of said arcuate guide member outside the platform back wall thereby limiting downward movement of the hold down member.

References Cited in the file of this patent

UNITED STATES PATENTS

| | | |
|---|---|---|
| 1,495,652 | Taliaferro | May 27, 1924 |
| 2,045,081 | Hart | June 23, 1936 |
| 2,066,756 | Anderson | Jan. 5, 1937 |
| 2,155,423 | Korsmo et al. | Apr. 25, 1939 |
| 2,311,865 | Pilcher | Feb. 23, 1943 |